United States Patent
Kim et al.

(10) Patent No.: US 11,070,666 B2
(45) Date of Patent: Jul. 20, 2021

(54) METHODS AND DEVICES FOR IMPROVEMENTS RELATING TO VOICE QUALITY ESTIMATION

(71) Applicant: Dolby Laboratories Licensing Corporation, San Francisco, CA (US)

(72) Inventors: Doh-Suk Kim, Cupertino, CA (US); Shen Huang, Beijing (CN)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 16/659,485

(22) Filed: Oct. 21, 2019

(65) Prior Publication Data
US 2020/0162603 A1    May 21, 2020

Related U.S. Application Data

(62) Division of application No. 15/539,101, filed as application No. PCT/IB2015/059962 on Dec. 23, 2015, now Pat. No. 10,455,080.

(Continued)

(30) Foreign Application Priority Data

Dec. 23, 2014    (WO) ................ PCT/CN2014/094673
Jan. 27, 2015    (EP) .................................... 15152715

(51) Int. Cl.
*H04L 12/26*    (2006.01)
*H04M 3/22*    (2006.01)
*G10L 25/60*    (2013.01)

(52) U.S. Cl.
CPC .......... *H04M 3/2236* (2013.01); *H04L 43/04* (2013.01); *H04L 43/0829* (2013.01); *G10L 25/60* (2013.01)

(58) Field of Classification Search
CPC ..... G10L 25/60; H04L 43/04; H04L 43/0829; H04M 3/2236
See application file for complete search history.

(56) References Cited

U.S. PATENT DOCUMENTS

| 5,493,584 A | 2/1996 | Emeott |
| 6,549,580 B1 | 4/2003 | Kang |

(Continued)

FOREIGN PATENT DOCUMENTS

| WO | 2006035269 | 4/2006 |
| WO | 2014004708 | 1/2014 |

OTHER PUBLICATIONS

Ding L. et al., "Non-intrusive single-ended speech quality assessment in VoIP", Speech Communication, Elsevier Science Publishers, Amsterdam NL, vol. 49, No. 6, pp. 477-489 XP022113625, Jun. 1, 2007.

(Continued)

*Primary Examiner* — Minh Trang T Nguyen

(57) ABSTRACT

This disclosure falls into the field of voice communication systems, more specifically it is related to the field of voice quality estimation in a packet based voice communication system. In particular the disclosure provides a method and device for reducing a prediction error of the voice quality estimation by considering the content of lost packets. Furthermore, this disclosure provides a method and device which uses a voice quality estimating algorithm to calculate the voice quality estimate based on an input which is switchable between a first and a second input mode.

11 Claims, 4 Drawing Sheets

Related U.S. Application Data

(60) Provisional application No. 62/128,382, filed on Mar. 4, 2015.

(56) References Cited

U.S. PATENT DOCUMENTS

| | | | |
|---|---|---|---|
| 7,586,852 B2 | 9/2009 | Jagadeesan | |
| 7,792,041 B2 | 9/2010 | Take | |
| 8,059,634 B1 | 11/2011 | Evans | |
| 8,184,537 B1 | 5/2012 | Gopal | |
| 8,305,913 B2 | 11/2012 | El-Hennawey | |
| 8,355,334 B2 | 1/2013 | Malhotra | |
| 8,559,320 B2 | 10/2013 | Khanduri | |
| 8,593,975 B2 | 11/2013 | El-Hennawey | |
| 8,804,758 B2 | 8/2014 | Bender | |
| 8,873,543 B2 | 10/2014 | Hua | |
| 2002/0197974 A1* | 12/2002 | Weinholt | H04B 1/44 455/313 |
| 2004/0170164 A1 | 9/2004 | Leblanc | |
| 2005/0243811 A1* | 11/2005 | Jagadeesan | H04L 41/142 370/356 |
| 2008/0215791 A1* | 9/2008 | Aoki | H04H 60/04 710/316 |
| 2009/0076829 A1 | 3/2009 | Ragot | |
| 2009/0094026 A1 | 4/2009 | Cao | |
| 2013/0100969 A1* | 4/2013 | Vafin | H04L 43/087 370/517 |
| 2013/0308800 A1* | 11/2013 | Bacon | B29C 53/06 381/300 |
| 2014/0064137 A1 | 3/2014 | El-Hennawey | |
| 2014/0161031 A1 | 6/2014 | Grunert | |
| 2014/0219471 A1* | 8/2014 | Deshpande | H04R 3/005 381/92 |

OTHER PUBLICATIONS

Falk T., "Blind Estimation of Perceptual Quality for Modern Speech Communications", Canadian theses, XP055208123, Dec. 22, 2008,pp. 1-212.

Leman A. et al., "Hybrid Model for Non-Intrusive Speech Quality Evaluation in Telephony Applications", Conference: 38th International Conference: Sound quality evaluation , AES, New York, XP040567008, Jun. 13, 2010.

Lingfen S. et al., "Voice quality prediction models and their application in VoIP networks", IEEE Transactions on Multimedia, vol. 8 No. 4, pp. 809-820, XP055208109, Aug. 1, 2006.

Nishikawa K. et al., "Extension of Image Transport Protocol Allowing Sever-Side Control of Request for Retransmission", IEICE Transactions on Fundamentals of Electronics Communications and Computer Sciences, Engineering Sciences Society, Tokyo JP, vol. E87-A, No. 3, pp. 674-681, XP001190007, Mar. 1, 2004.

Sofiene J. et al., "Voicing-aware parametric speech quality models over VoIP networks", Information Infrastructure Symposium, 2009, GIIS '09, IEEE, Piscataway, NJ, XP031558369, Jun. 23, 2009, pp. 1-8.

Uemura S. et al., "Objective speech quality assessment based on payload discrimination of lost packets for cellular phones in NGN environment", IEICE Transactions on Communications, Communications Society, Tokyo JP, vol. E91-B, No. 11, pp. 3667-3676, XP001519001, Nov. 1, 2008.

* cited by examiner

METHODS AND DEVICES FOR IMPROVEMENTS RELATING TO VOICE QUALITY ESTIMATION

CROSS-REFERENCE TO RELATED APPLICATIONS

The present application is a divisional of U.S. patent application Ser. No. 15/539,101, filed Jun. 22, 2017, which claims priority to International Patent Application No. PCT/IB2015/059962, filed Dec. 23, 2015, and further claims benefit of priority to US Provisional Patent Application No. 62/128,382, filed Mar. 4, 2015, International Patent Application No. PCT/CN2014/094673, filed Dec. 23, 2014 and European Patent Application No. 15152715.7, filed Jan. 27, 2015, each of which is hereby incorporated by reference in its entirety.

TECHNICAL FIELD

This disclosure falls into the field of voice communication systems, more specifically it is related to the field of voice quality estimation in a packet based voice communication system. In particular the disclosure provides a method and device for reducing a prediction error of the voice quality estimation by considering the content of lost voice packets. Furthermore, this disclosure provides a method and device which uses a voice quality estimating algorithm to calculate the voice quality estimate based on an input which is switchable between a first and a second input mode.

BACKGROUND ART

In previous years, Voice over internet protocol (VoIP) has become an important application and is expected to carry more and more voice traffic over TCP/IP networks.

In such Internet protocol (IP)-based voice communications systems, typically a voice waveform of a user is sliced in time, compressed by a voice coder, packetized, and transmitted to other users. Due to the inherent nature of IP networks and real-time constraint of human voice communications, it is common to lose voice packets during transmission or that late voice packets are discarded even if they are received, resulting in degraded voice quality. Mobile and WIFI networks usually make the situation worse in many cases. Thus, accurate real-time monitoring of voice quality is an essential feature for analysis, management, and optimization of voice communication systems.

A typical voice quality monitoring system adopts a scheme that analyzes packet loss information, such as packet loss rate and loss patterns (e.g., if the losses are random or of a bursty nature), as it provides a simple and computationally inexpensive way to estimate voice quality. This scheme is known as a modified E-model. However, these systems suffer from low accuracy in estimating voice quality since they do not take the content (e.g. the payload) of the lost voice packets into consideration when estimating the voice quality.

More accurate voice quality estimation may be achieved by analyzing voice waveforms after fully decoded all the packets and other data sent in the VoIP call (e.g. ITU-T P.563, ANSI ANIQUE+). However, this approach requires extensive computation for analyzing the voice waveforms. Moreover, this approach discards important packet loss statistic information available at packet level.

Thus, it is desirable to have a voice quality monitoring system utilizing both packet loss information and speech waveform information without an expensive full decoding process.

BRIEF DESCRIPTION OF THE DRAWINGS

Example embodiments will now be described with reference to the accompanying drawings, on which.

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

Figure 1:
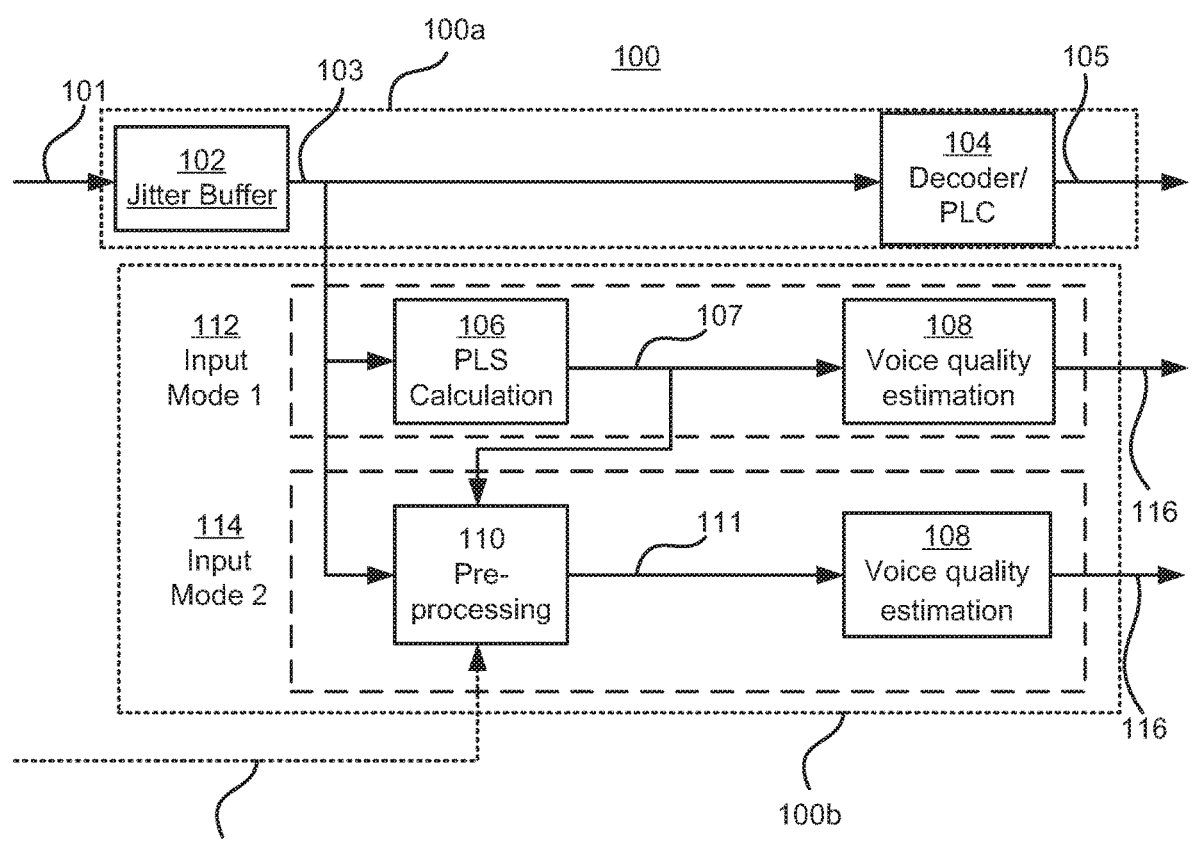
FIG. 1 is a generalized block diagram of a voice quality estimating device in accordance with an example embodiment.

In view of the above it is an object to provide a device and associated methods which provide a reduced prediction error of a voice quality estimate by modifying conventional statistical metrics relating to lost voice packet based on a perceptual importance of the lost voice packets. Moreover, it is an objective to provide a device and associated methods which facilitate two operational modes when calculating a voice quality estimate, such that a low complexity mode and a high accuracy mode are provided.

I. Overview—Using Perceptual Importance of Lost Packets

According to a first aspect, example embodiments propose methods for modifying a statistical metric relating to lost voice packets, devices implementing the methods, and computer program product adapted to carry out the method. The proposed methods, devices and computer program products may generally have the same features and advantages.

According to example embodiments there is provided a method for modifying a statistical metric relating to lost voice packets in a packet based voice communication system.

The method comprises receiving data comprising a sequence of encoded voice packets transmitted from one or more end-points in the voice communication system, wherein encoded voice packets transmitted from the one or more end-points comprises the received sequence of encoded voice packets and one or more lost voice packets which were lost during the transmission from the one or more end-points or discarded due to latency and/or jitter in the transmission.

The method further comprises calculating, based on the received sequence of encoded voice packets, a statistical metric relating to the lost voice packets, and modifying the statistical metric based on a perceptual importance of the lost voice packets, so as to reduce a prediction error of a voice quality estimate when using the modified statistical metric as input to a voice quality estimating algorithm.

This disclosure relates generally to a teleconferencing system comprising a plurality of telephone endpoints, and in particular to the improvement of perceived call quality when such a system experiences channel degradation or network degradation.

By way of background, in a typical teleconferencing system, a mixer receives a respective uplink data stream from each of the telephone endpoints in a voice call, which carries an audio signal captured by that telephone endpoint, and sends a respective downlink data stream to each of the telephone endpoints. Consequently, each telephone endpoint receives a downlink data stream which carries a mixture of the respective audio signals captured by the other telephone endpoints. Accordingly, when two or more participants in a telephone conference speak at the same time, the other participant(s) can hear both participants speaking.

If there is a problem with the data channel which carries the downlink and uplink data streams to and from one of the endpoints, this may cause errors in the downlink and/or uplink data streams. The errors may be perceptible to the participant using said one of the endpoints, and/or to other participants in the voice call. The errors may result in lost voice packets which were lost during the transmission from the one or more end-points.

The errors may further result in jitter. Jitter is technically the measure of the variability over time of the latency across a network and is a common problem in a packet based voice communication system. Since the voice packets can travel by a different path from the sender to the receiver, the voice packets may arrive at their intended destination in a different order then they were originally sent. Even if a Jitter buffer is used to temporarily store arriving voice packets in order to minimize delay variations, some jitter characteristics exceed the capability of a jitter buffer and some voice packets may still be arriving to late. These packets are eventually discarded. This discarded voice packets are thus looked upon as lost voice packets which were discarded due to latency and/or jitter in the transmission.

The voice packets which are lost may thus be passively lost in transmission or actively discarded (e.g. by a Jitter buffer) due to jitter/latency.

This above discussed problems relating to the errors in the downlink and/or uplink data streams may result in that out of the encoded voice packets that are transmitted from the one or more end-points, some are lost during the transmission or discarded due to latency and/or jitter in the transmission, and the rest are received as a sequence of encoded voice packets.

As used herein an end-point refers to a telephone endpoint and/or a mixer. It should be noted that the term telephone endpoint comprises any endpoint device which can be used in a teleconferencing system in which sound is converted into electrical impulses for transmission, and in which electrical impulses are converted back to sound.

The above method provides a simple and flexible way of reducing the prediction error of a voice quality estimate.

Conventional statistical metrics when calculating a voice quality estimate does not take into account the payload of the lost voice packets. The payload contains voice waveforms or audio data of the corresponding time frame in the voice call. Rather, only the information whether a voice packet is lost or received is taken into account.

However, the content of lost voice packets may be very relevant for reducing a prediction error of a voice quality estimate. For example, a lost voice packet which carries audio data representing the voice of a main presenter in the voice call may decrease the perceived voice quality more than a lost voice packet which carries audio data representing the silence of a listener in the voice call. Consequently, by using the perceptual importance of the lost voice packets for calculating a statistical metric which subsequently can be used as input to a voice quality estimating algorithm, the prediction error of a voice quality estimate can be reduced.

By reducing the prediction error, problems that may result in one or more participants perceiving degraded call quality can be detected earlier and/or more accurately and thus better handled.

According to example embodiments, the step of modifying the statistical metric comprises weighting the lost voice packets according to their perceptual importance. Consequently, the perceptual importance of each lost voice packet may be taken into account. E.g. two consecutive lost voice packets may have different perceptual importance and thus weighted differently when calculating the voice quality estimate. This may provide an improved flexibility when modifying the statistical metrics.

According to example embodiments, the statistical metric relates to groups of consecutive lost voice packets, each group comprising one or more lost voice packets, wherein in the step of calculating the statistical metrics, each group of consecutive lost voice packets is weighted based on the number of consecutive lost voice packets in the group, and wherein, in the step of modifying the statistical metric, each group is further weighted based on the perceptual importance of the lost voice packets in the group.

Since the statistical metric is based on groups of consecutive lost voice packets, the pattern of the loss packets is taken into account. It should be noted that a group may comprise just one lost voice packets.

In a packet based voice communication system, random loss patterns may decrease the voice quality less than if the lost packets are grouped (e.g. a bursty loss pattern), since a larger number of consecutive lost voice packets may increase the risk of perceptually important data being lost. For example, loss of a number of consecutive voice packets which carry audio data representing the voice of a main presenter, while he or she is making an important point, negatively affects a perceived voice quality more than the loss of the same number of voice packets spaced apart over a time period of the uplink data stream from the main presenter. In other words, a bursty loss pattern may increase the risk that a whole word or an important phoneme is lost, while a more random loss pattern may be disregarded by a listener.

According to example embodiments, the perceptual importance for a lost voice packet is estimated based on perceptual importance of voice packets in the sequence of encoded voice packets which are adjacent to the packets that were lost during the transmission from the one or more end-points or discarded due to latency and/or jitter of the transmission.

Consequently, the perceptual importance of a lost voice packet can be estimated without having any information pertaining to the actual lost voice packets. Moreover, since each voice packet corresponds to a small time frame such as $1/100$ or $1/50$ second for example, it is likely that a voice packet with a certain perceptual importance is followed and preceded by voice packets with a similar perceptual importance. It should be noted that a voice packet may correspond to a first time frame (e.g. 20 ms) while another voice packet in the same transmission may correspond to a second time frame (e.g. 10 ms).

According to example embodiments, each voice packet in the received sequence of encoded voice packets comprises a separate bit, or separate bits, indicating the perceptual importance of the voice packet. This may reduce the computational complexity for extracting the perceptual importance from a voice packet, since no analyzing of the actual voice waveforms in the voice packet needs to be performed in order to extract the perceptual importance.

According to example embodiments, the method further comprises the step of: receiving a signal indicating the perceptual importance of each of the encoded voice packets transmitted from the one or more end-points. This embodiment may be advantageous in that perceptual importance of the lost packets are still described in the signal indicating the perceptual importance of each of the encoded voice packets transmitted from the one or more end-points. Consequently, no analysis or calculation based on adjacent voice packets needs to be performed in order to estimate the perceptual importance of the lost voice packet(s). This may lead to a lower computational complexity when modifying the statistical metric based on the perceptual importance of the lost voice packets.

According to example embodiments, the method further comprises the step of partially decoding at least some of the received encoded voice packets in order to estimate perceptual importance of the lost voice packets. The encoded voice packets may for example be encoded using a modified discrete cosine transform, MDCT, based encoder, wherein MDCT gain parameters are extracted by partially decoding the at least some of the received encoded voice packets, wherein the MDCT gain parameters are used for estimating the perceptual importance of the lost voice packets. This may reduce the computational complexity of the estimation of the perceptual importance of the lost voice packets compared to a strategy where the voice packets are fully decoded and analyzed.

According to example embodiments, the method further comprises the step of fully decoding at least some of the received encoded voice packets in order to estimate perceptual importance of the lost voice packets. This may improve the estimation of the perceptual importance of the lost packet and this in combination with packet loss statistics on a packet level may reduce the prediction error of the voice quality estimate compared to the strategy used in ITU-T P.563, ANSI ANIQUE+.

According to example embodiments, the statistical metric includes at least one of: a packet loss rate, PLR, which is the number of lost voice packets in relation to a total number of transmitted voice packets, and a burstiness factor, BF, which is one minus a number of groups of consecutive lost voice packets in relation to the number of lost voice packets.

These are typical parameters in conventional voice quality estimating algorithms and by modifying at least one of these statistical matrices, such voice quality estimating algorithms may be reused.

According to example embodiments, the step of modifying the statistical metric based on a perceptual importance of the lost voice packets comprises linear or non-linear mapping of PLR and/or BF. This will be explained in detail below.

According to example embodiments, the perceptual importance of a voice packet is based on at least one of: a loudness value of the voice packet, a phoneme category of the voice packet, and a frequency band weighted signal energy level of the voice packet. These parameters all address the perceptual importance of a voice waveform and may be used separately or in combination in order to extract the perceptual importance of a voice packet.

As used herein "loudness" represents a modeled psychoacoustic measurement of sound intensity; in other words, loudness represents an approximation of the volume of a sound or sounds as perceived by the average user. The loudness may e.g. refer to a dialnorm value (according to the ITU-R BS.1770 recommendations) of the voice waveform. Other suitable loudness measurements standards may be used such as Glasberg's and Moore's loudness model which provides modifications and extensions to Zwicker's loudness model.

According to example embodiments, the received data further comprises packets representing the one or more lost voice packets. As explained above, a device in a teleconferencing system, e.g. a mixer or a telephone endpoint usually comprises a Jitter buffer which stores incoming voice packets, which may arrive in irregular time intervals, to create voice packets in evenly spaced time intervals. By also creating packets, for example with a mark for lost voice packets, the output from the Jitter buffer always looks the same when it comes to the number of voice packets per time frame and the time period between the voice packets. This in turn makes may reduce the complexity of the rest of the system, e.g. the parts which calculate the voice quality estimate.

According to example embodiments there is provided a computer-readable medium comprising computer code instructions adapted to carry out any method of the first aspect when executed on a device having processing capability.

According to example embodiments there is provided a device for estimating a voice quality in a packet based voice communication system. The device comprises a receiving stage configured to receive data comprising a sequence of encoded voice packets transmitted from one or more end-points in the voice communication system, wherein encoded voice packets transmitted from the one or more end-points comprises the received sequence of encoded voice packets and one or more lost voice packets which were lost during the transmission from the one or more end-points or discarded due to latency and/or jitter in the transmission. The device further comprises a calculating stage configured to calculate, based on the received sequence of encoded voice packets, a statistical metric relating to a number of lost voice packets. The device further comprises a perceptual transformation stage configured to modify the statistical metric based on a perceptual importance of the lost voice packets, so as to reduce a prediction error of a voice quality estimate when using the modified statistical metric as input to a voice quality estimating algorithm.

II. Overview—Switchable Input Modes

According to a second aspect, example embodiments propose methods for calculating a voice quality estimate in a packet based voice communication system, devices implementing the methods, and computer program product adapted to carry out the method. The proposed methods, devices and computer program products may generally have the same features and advantages. Generally, features of the second aspect may have the same advantages as corresponding features of the first aspect.

According to example embodiments there is provided a method for calculating a voice quality estimate in a packet based voice communication system. The method comprises the steps of: receiving data comprising a sequence of encoded voice packets, using a voice quality estimating algorithm to calculate the voice quality estimate based on an input which is switchable between a first and a second input mode.

In the first input mode, the input is a statistical metric relating to the sequence of encoded voice packets.

In the second input mode, the input is a pre-processed version of the statistical metric relating to the sequence of encoded voice packets.

According to this method, the pre-processing improve the accuracy of the voice quality estimate such that a prediction error of the voice quality estimate based on the pre-processed version of the statistical metric is reduced compared with the prediction error of the voice quality estimate based on the statistical metric. By providing two input modes, one which is for low complexity and one that provides a higher accuracy, a more flexible method for calculating voice quality estimate is provided. Moreover, since the two input modes share the same voice quality estimation algorithm, improved scalability may be achieved.

According to example embodiments, the method further comprises the step of receiving input from one of the end-points indicating one of the first and the second input mode to be selected. This input may for example be triggered by that a user of an end-point telephone perceives the voice quality to be unsatisfying. In this case, a better estimate of the voice quality at e.g. the mixer may be needed in order to better take care of the problem in the transmission of the voice packet.

According to example embodiments, a selection between the first and the second input mode is based on a computational load associated with the first and the second input mode. In this case, for example the mixer itself may switch from the second input mode to the first input mode if the processors of the mixer are getting to computationally overloaded. This may e.g. happen if many end-points are connecting to the voice call, such that more mixing needs to be performed.

According to example embodiments, the selection between the first and the second input mode is based on the computational load associated with the first and the second input mode in relation to a desired voice quality estimation accuracy. Consequently the switching between the two input modes may be a trade-off between computational load of the device performing the method and the accuracy of the voice quality estimate.

According to example embodiments, a selection between the first and the second input mode is based on a preset mode.

According to example embodiments, the received data is transmitted from one or more end-points in the voice communication system, wherein encoded voice packets transmitted from the one or more end-points comprises the received sequence of encoded voice packets and one or more lost voice packets which were lost during the transmission from the one or more end-points or discarded due to latency and/or jitter in the transmission, wherein the statistical metric is calculated from the received sequence of encoded voice packets and relates to the lost voice packets, and wherein the pre-processing relates to modification of the statistical metric based on a perceptual importance of the lost voice packets. As described above, by taking the perceptual importance of the lost voice packets into account when calculating the voice quality estimate, a more accurate voice quality estimate may be achieved. It should be noted that any other type of pre-processing may be employed, for example using Gaussian mixture models as described in "An Improved GMM-Based Voice Quality Predictor" (Falk et. al), or using articulatory transitions (i.e. active and passive articulators) of vowel and consonant phonemes in order to modify the statistical metric.

According to example embodiments, the pre-processing comprises weighting the lost voice packets according to their perceptual importance.

According to example embodiments, the statistical metric relates to groups of consecutive lost voice packets, each group comprising one or more lost packets, wherein the statistical metric is calculated by weighting each group of consecutive lost voice packets based on the number of consecutive lost voice packets in the group, and wherein the pre-processing further comprises weighting each group based on the perceptual importance of the lost voice packets in the group.

According to example embodiments, the perceptual importance for a lost voice packet is estimated based on perceptual importance of voice packets in the sequence of encoded voice packets which are adjacent to the packets that were lost during the transmission from the one or more end-points.

According to example embodiments, the method further comprises the step of at least partially decode at least some of the received encoded voice packets in order to estimate perceptual importance of the lost voice packets.

Such at least partially decoding may result in an increased computational load on the device performing the method. Consequently, when the second input mode comprises at least partially decoding some of the received encoded voice packets; it may be even more advantageous to have two input modes such that the computational load of the device may be relaxed if needed.

According to example embodiment, each voice packet in the received sequence of encoded voice packets comprises a separate bit indicating the perceptual importance of the voice packet.

According to example embodiments, the method further comprises the step of receiving a signal indicating the perceptual importance of each of the encoded voice packets transmitted from the one or more end-points.

According to example embodiment, the statistical metric includes at least one of: a packet loss rate, PLR, which is the number of lost voice packets in relation to a total number of transmitted voice packets, and a burstiness factor, BF, which is one minus a number of groups of consecutive lost voice packets in relation to the number of lost voice packets.

According to example embodiment, the perceptual importance of a voice packet is based on at least one of: a loudness value of the voice packet, a phoneme category of the voice packet, and a frequency band weighted signal energy level of the voice packet.

According to example embodiment there is provided a computer-readable medium comprising computer code instructions adapted to carry out any method of the second aspect when executed on a device having processing capability.

According to example embodiments there is provided a device for calculating a voice quality estimate in a packet based voice communication system. The device comprises a receiving stage configured to receive data comprising a sequence of encoded voice packets, and a voice quality estimation stage configured to use a voice quality estimating algorithm to calculate the voice quality estimate based on an input which is switchable between a first and a second input mode, wherein, in the first input mode, the input is a statistical metric relating to the sequence of encoded voice packets, wherein in the second input mode, the input is a pre-processed version of the statistical metric relating to the sequence of encoded voice packets, and wherein a prediction error of the voice quality estimate based on the pre-processed version of the statistical metric is reduced compared with the prediction error of the voice quality estimate based on the statistical metric.

III. Example Embodiments

FIG. 1 describes a generalized block diagram of a voice quality estimating device 100 in accordance with an example embodiment. The device 100 is part of a packet based voice communication system, e.g. a mixer or a telephone end-point in a teleconferencing system.

The device 100 comprises two different parts 100a, 100b. The upper part 100a in FIG. 1 comprising a Jitter buffer 102 and a stage 104 for decoding and packet loss concealment (PLC) is a typical voice processing unit at a receiver, e.g. a mobile phone. The Jitter buffer 102 typically is a buffer which receives incoming voice packets 101 from other parts of the packet based voice communication system. The incoming voice packets 101 usually arrive in irregular time intervals due to problems with the uplink and/or downlink data streams in the packet based voice communication system. Some of the incoming packets are discarded since they are late due to latency in the network, meaning that the corresponding time segment of the voice call already has been rendered by a speaker of the receiver. Some voice packets will be discarded due to that the jitter characteristics exceed the capability of a jitter buffer. The Jitter buffer 102 may output voice packets 103 in evenly spaced time intervals. Optionally the Jitter buffer 102 may also create packets representing to the lost voice packet, mark them as such and include them in the outputted voice packets 103 in evenly spaced time intervals. The mark for lost voice packet may be a single bit in the outputted voice packets, e.g. a zero if the voice packet is not lost and a one if the voice packet represents a lost voice packet. The Jitter buffer may for example use sequence numbers included in the voice packets in order to determine if packets are lost or not and where those lost voice packets originally (when transmitted) were located in the stream of voice packets.

The stage 104 for decoding and PLC decodes the contents (payload) of the stream of voice packets to synthesize voice waveforms. If there are losses in voice packets, possibly marked by the Jitter buffer 102 or otherwise known to the stage 104 (e.g. by a running number in each voice packet), PLC is employed to estimate voice waveforms of the lost packets by using the previously received voice packets.

The lower part 100b of the device 100 in FIG. 1 is the part that performs the estimation of the impact of lost packets on the perceived voice quality, i.e. the part that calculates the voice quality estimate 116. The calculated voice quality estimate 116 may be outputted in the mean opinion score (MOS) scale.

The outputted voice packets 103 from the Jitter buffer 102 are received by a packet loss statistics (PLS) calculating unit 106 (i.e. a calculation stage of the device 100). The PLS calculation unit 106 comprises a receiving stage which is adapted to receive data comprising a sequence of encoded voice packets 103 transmitted from one or more end-points in the voice communication system. As described above, some of the encoded voice packets transmitted from the one or more end-points may have been lost during the transmission from the one or more end-points to the device 100 or discarded by the Jitter buffer 102 for being late. These lost packets may cause a reduced perceptual quality of the voice call which the encoded voice packets relate to.

The PLC calculation unit 106 is configured to calculate, based on the received sequence 103 of encoded voice packets, a statistical metric 107 relating to a number of lost voice packets. The statistical metric 107 may include a packet loss rate, PLR, which is the number of lost voice packets in relation to a total number of transmitted voice packets. For example, if 10 out of 100 voice packets are lost, the PLR equals 0.1.

Additionally or alternatively, the statistical metric 107 may relate to a burstiness factor, BF, which is one minus a number of groups of consecutive lost voice packets in relation to the number of lost voice packets. If, out of the 10 lost voice packet, three groups of consecutive lost packets can be formed, e.g. comprising 1, 3 and 6 lost voice packet each, the BF equals $1-(3/10)=0.7$.

The device 100 comprises two different input modes 112, 114 for calculating a voice quality estimate 116 in a voice quality estimation stage 108. It should be noted that the voice quality estimation stage 108 of the both modes are equal, i.e. the same voice quality estimation algorithm is used independently of which of the two input modes 112, 114 that is employed.

The first input mode 112 only uses statistics on a packet level, e.g. the PLR and/or the BF, for calculating a voice quality estimate. This is a typical way of calculating a voice quality estimate which is computationally inexpensive but that may suffer from low accuracy of the voice quality estimate since the actual content of the lost voice packets is not considered.

An example embodiment of the voice quality estimation stage 108 will now be described. According to this embodiment, the voice quality estimation stage 108 requires two inputs, which are a packet loss rate value and a burstiness value.

The voice quality estimation stage 108 comprises L regression models. L is a preset number of choices of burstiness factors. For example, the voice quality estimation stage 108 may comprise six regression models (L=6), each corresponding to a BF value of 0, 0.2, 0.4, 0.6, 0.8 and 1.0 respectively.

Given an input of a PLR value and BF value, two regression models are selected that have the closest proximity to the value of BF, and these two regression models estimate voice quality values from the PLR value. The final voice quality is estimated by the weighted sum of the two voice quality values.

However, in order to improve the accuracy of the voice quality estimate 116, the second input mode 114 may be used. In the second input mode 114, the input to the voice quality estimation stage 108 is a pre-processed version 111 of the statistical metric 107 relating to the sequence of encoded voice packets that is calculated by the PLS calculation unit 100. The pre-processing made in a pre-processing stage 110 of the device 100 which will be described in detail below.

The switching between the first 112 and the second 114 input modes may be based on a received input (not shown in FIG. 1) from one of the end-points indicating one of the first and the second input mode to be selected.

For example, telephone end-points connected to the packet based teleconference may determine the operation mode of the device 100 (e.g. the conference server or another telephone end-point). Also the conference server, or mixer, may send the appropriate signaling for determining the operation mode, when the device 100 is a telephone end-point connected to the packet based teleconference.

According to other embodiments, the telephone end-point, or conference server, where the voice quality estimate 116 is calculated, can select between the first 112 and the second 114 input mode based on a computational load associated with the first 112 and the second 114 input mode. As understood from the above, the calculation of the voice quality estimate 116 in the first input mode 112 is fairly straight forward and thus has a low computational complexity. The calculation of the voice quality estimate 116 in the second input mode 114 often mean higher computational complexity, depending on what type of pre-processing that is employed. The device 100 calculating the voice quality estimate 116 may thus determine which of the two input modes 112, 114 that should be used depending on its available computational resources. Moreover, the selection between the first 112 and the second 114 input mode may based on the computational load associated with the first and the second input mode in relation to a desired voice quality estimation accuracy.

The selection of the input mode to use can also be based on a preset mode.

The pre-processing made in a pre-processing stage 110 of the device 100 may according to some embodiments relate to modifying the statistical metric based on a perceptual importance of the lost voice packets. For example, the PLR value and/or the BF value may be transformed according to the perceptual importance of the lost packets and further inputted to the voice quality estimation stage 108 which will use the inputted values 111 as explained above.

This use of the PLR and BF values in the voice quality estimation stage 108, with or without being perceptually weighted will be further explained in conjunction with FIG. 4 below.

The perceptual importance of a voice packet may be based on one or more out of several properties of the voice waveform of the voice packet. According to some embodiments, the perceptual importance is based on a loudness value of the voice packet, i.e. a loudness value of the voice waveform in the payload of the voice packet. According to other embodiments, the perceptual importance is based on a frequency band weighted signal energy level (or loudness level) of the voice packet. This energy level may be transformed to the loudness value (e.g. in the Sone unit) by:

$$\text{Loudness}=2^{0.1*P-4} \qquad (1)$$

where P is the frequency band-weighted signal energy level or loudness level.

Other information, such as phoneme categories around or for the voice packet can be used together with loudness information or separately to calculate the perceptual importance of the voice packet.

Figure 2:
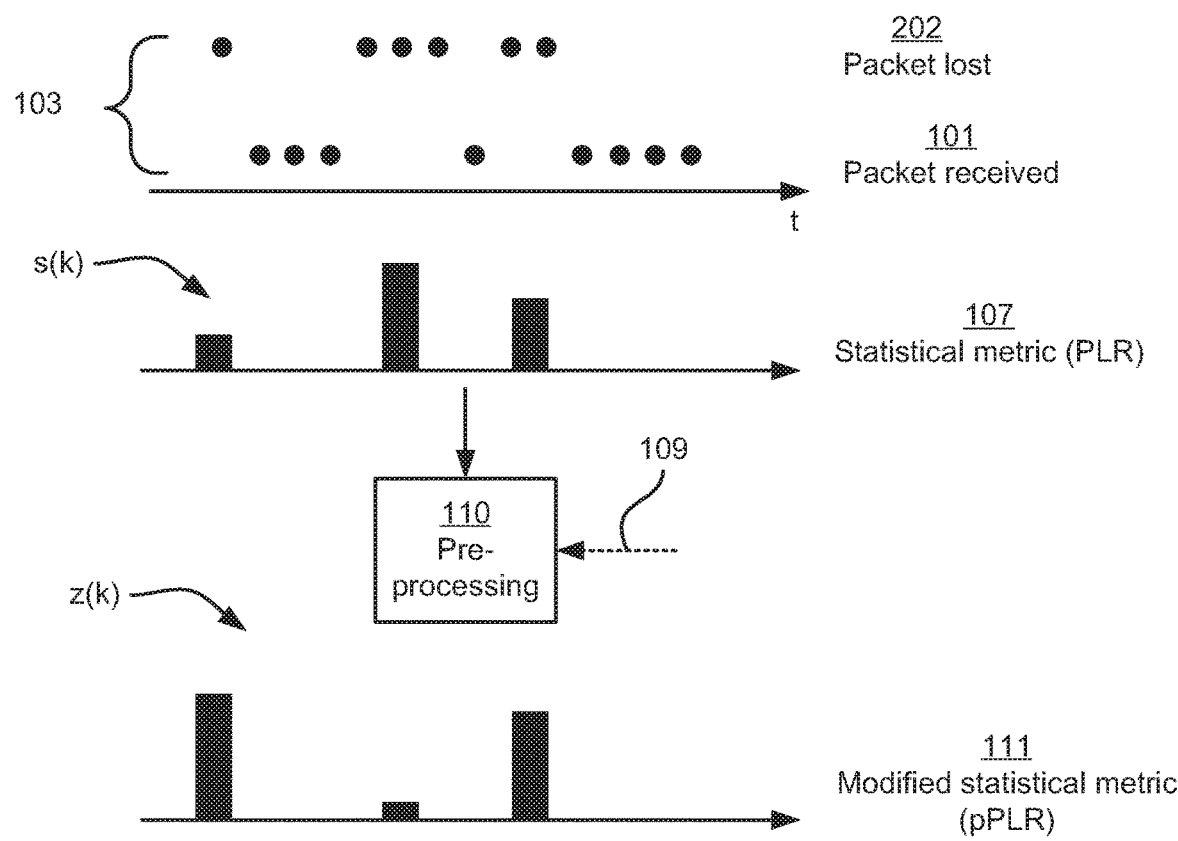
FIG. 2 shows by way of example a modification of a statistical metric relating to groups of consecutive lost voice packets, wherein the modification is based on a perceptual importance of the lost voice packets in each group, FIG. 3 describe by way of example how perceptual importance of lost voice packet is estimated based on voice packets which are adjacent to the lost voice packets.
Figure 3:
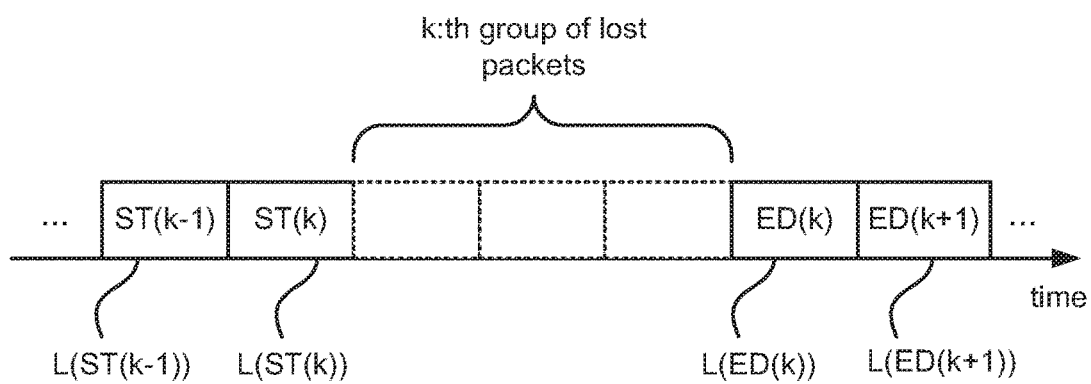

The calculation and use of the perceptual importance of the lost voice packet will now be further described in conjunction with FIGS. 2 and 3.

According to some embodiments, the statistical metric relates to groups of consecutive lost voice packets, wherein in the step of calculating the statistical metrics, each group of consecutive lost voice packets is weighted based on the number of consecutive lost voice packets in the group. This is described in FIG. 2. The upper part of FIG. 2 exemplifies a relation between received packets 101 and lost packets 202 in encoded voice packets transmitted from the one or more end-points to the device 100. As described above in conjunction with FIG. 1, the Jitter buffer 102 may include packets representing the one or more lost voice packets 202 in the data 103 received by the PLS calculation unit 106 and optionally by the pre-processing stage 110. These packets may be empty and/or comprising data indicating that they represent a lost packet. This is described in FIG. 2 where the data 103 comprises the empty packets representing the one or more lost voice packets 202.

Given a time series of lost voice packets that can be obtained from 103, a packet loss event function, s(k) can be defined, which represents the number of consecutive lost packets at the k-th group a loss event, for k=1, 2, . . . , K, where K is the number of groups of consecutive lost packets. In FIG. 2, the number of such groups is 3. The packet loss event function s(k) in this example is a vector with the values [1, 3, 2]. Then the packet loss rate (PLR) can be calculated by $$\text{PLR}=\Sigma_{k=1}^{K}s(k)/M \qquad (2)$$

where M is the total number of packets received 101 and packets lost 202, i.e. M=14 in FIG. 2.

FIG. 2 further describe how the statistical metric 107 (in this case the vector s(k)) is inputted to the pre-processing stage 110. The pre-processing stage may for example be a perceptual transformation stage configured to modify the statistical metric 107 based on a perceptual importance of the lost voice packets such that each group is further weighted based on the perceptual importance of the lost voice packets in the group. The perceptual transformation stage transforms the vector s(k) to a new vector z(k), from which a perceptual packet loss rate (pPLR) can be calculated by $$p\text{PLR}=\Sigma_{k=1}^{K}z(k)/M \qquad (3)$$

z(k) is shown in FIG. 2 and this modified vector is used as the basis for calculating the modified statistical metric pPLR according to Equation 3.

The perceptual importance of the lost voice packets may be calculated in a number of different ways. For example, the pre-processing stage 110 may receive a signal 109 indicating the perceptual importance of each of the encoded voice packets transmitted from the one or more end-points. The signal 109 may thus comprise the perceptual importance of all of the voice packets in the data 103, including the lost voice packets 202. By employing such additional signal 109, the computational load of the pre-processing of the statistical metric 107 may be reduced.

According to other embodiments, the perceptual importance of a lost voice packet is estimated based on perceptual importance of voice packets in the sequence of encoded voice packets which are adjacent to the packets that were lost during the transmission from the one or more end-points or discarded by the Jitter buffer for being late. This may be advantageous since no extra signal needs to be transmitted, which may mean that the device 100 can be plugged into a standard packet based communication system. According to some embodiments, the device 100 may be configured to check if the additional signal 109 is received and in that case use it, and if the signal 109 is not received, estimate the perceptual importance of a lost voice packet based on perceptual importance of voice packets in the sequence of encoded voice packets which are adjacent to the packets that were lost during the transmission from the one or more end-points or discarded by the Jitter buffer for being late.

FIG. 3 describe how the perceptual importance of a lost voice packet is estimated based on perceptual importance of voice packets in the sequence of encoded voice packets which are adjacent to the packets that were lost during the transmission from the one or more end-points or discarded by the Jitter buffer for being late.

Let X be a K-by-(d+1) feature matrix, in which the k-th row represents the (d+1)-dimensional feature vector x(k) associated with the k-th group of lost voice packets, d being the number of features and the extra dimension is the constant shift term.

The feature vector x(k) contains useful information about the speech characteristics or perceptual importance of the k-th group of lost packets. In case the information is not available, i.e. no signal 109 is received by the device 100; this information can be estimated from the received neighboring packets around the lost packets.

In one example embodiment, the feature vector can be based on PLR and loudness information in the neighborhood of k-th group of lost packets, expressed as 1)

$$x(k) = [PLR\ L_{interp}(k)\ L_{left}(k)\ L_{right}(k)\ L_{td}(k)\ 1] \quad (4)$$

where $$L_{interp}(k) = \frac{[L(ST(k)) + L(ED(k))]}{2} \quad (5)$$

if $ED(k) - ST(k) < 6$ and $$L_{interp}(k) = \left[\frac{[L(ST(k)) + L(ED(k))]}{2} * 6 + L(ED(k) - ST(k) - 7)\right] / (ED(k) - ST(k) - 1) \quad (6)$$

otherwise.

ST(k) and ED(k) are the time index for a packet right before and after the k-th group loss.

$$L_{left}(k) = \Sigma_{i=0}^{2} L(ST(k)-i)/3, \quad (7)$$

$$L_{right}(k) = \Sigma_{i=0}^{2} L(ED(k)+i)/3, \quad (8)$$

$$L_{td}(k) = [L(ED(k)) - L(ST(k))]/[ED(k) - ST(k)] \quad (9)$$

L(i) being the estimated loudness of the voice packet of the i-th time index. This is summarized in FIG. 3.

The last term in x(k) is to accommodate the translation component in the linear transformation described below.

The perceptual packet loss event function, z=[z(1) z(2) ... z(K)], (shown in FIG. 2) can be derived by $$z = Xw \cdot s \quad (10)$$

where w=[w(1) w(2) ... w(d+1)] is the weighting factor of feature matrix X and s=[s(1) s(2) ... s(K)] is the vector representation of packet loss event function (as described in equation 2 and FIG. 2). The weighting factor w can be trained using training data sets such that the accuracy of the voice quality estimation is improved.

The process of obtaining perceptual packet loss event function can be interpreted as assigning perceptual importance to each group of packet loss event, where the perceptual importance is estimated by the linear combination of the features. It should be noted that a nonlinear combination of the features may also be used. For example, groups comprising over a threshold number of lost voice packets may be squared in the s-vector.

The perceptual packet loss rate (pPLR) can then be defined as in equation 3, $pPLR = \Sigma_{k=1}^{K} z(k)/M$, which thus transforms the PLR to a perceptual domain for calculating the voice quality estimate in more accurate manner.

Figure 4:
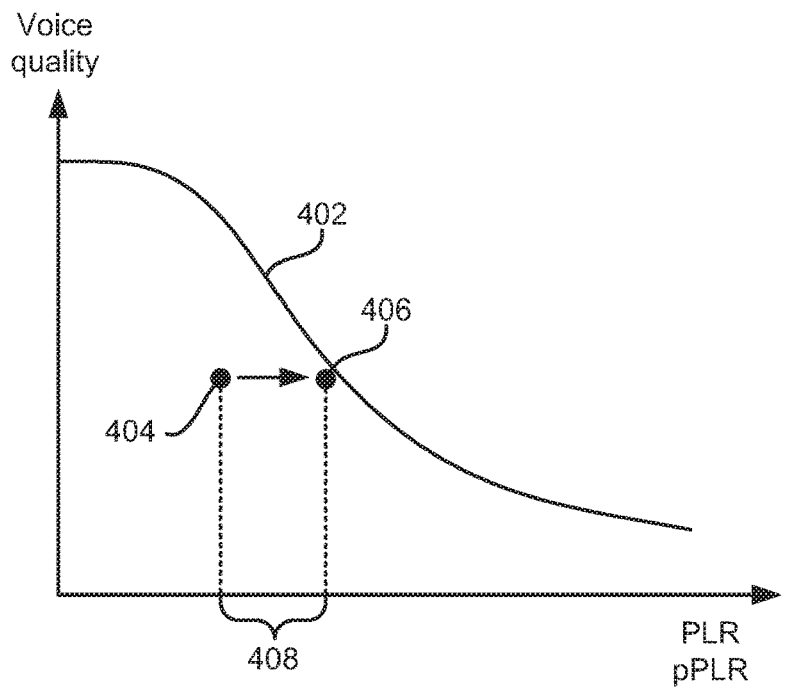
FIG. 4 shows by way of example how a prediction error of a voice quality estimate is reduced when using the perceptual importance of the lost voice packets when the voice quality estimate is calculated.

This concept is depicted in FIG. 4. The regression curve 402 is determined based on the BF value. The regression curve is based on empirical data of actual perceived voice quality and is thus a predefined reference. As described previously, the regression curve may also be determined based on a BF value transformed to a perceptual domain according to the above.

FIG. 4 shows how the use of the pPLR value 406 as input to the voice quality estimation stage reduces the prediction error by a large value (referred to as 408 in FIG. 4) compared to using the conventional PLR value 404 as input. In other words, by applying the process to transform PLR to pPLR, the data point 404 is translated to the data point 406, resulting in reduced voice quality estimation error using the same regression curve 402.

When deriving the perceptual importance of lost packets from adjacent voice packets as described above, the perceptual importance of the adjacent voice packet may be derived by partially decoding the required voice packets out of the received encoded voice packets. The payload of voice packets contains the encoded bits to produce the transmitted voice waveforms when rendering the voice call. The content of payload typically includes some form of information, e.g. in a separate bit or bits, which can be utilized to estimate energy level of the signal or loudness. In this case, the loudness information can be estimated by partial decoding of the payload instead of a full decoding process. For example, if the encoded voice packets are encoded using a modified discrete cosine transform, MDCT, based encoder, the MDCT gain parameters can be extracted by partially decoding a received encoded voice packet. The MDCT gain parameters can then be used for estimating the perceptual importance of the voice packet (and any neighboring lost voice packet).

For MDCT based coders, in order to reduce entropy in a subsequent coding process, MDCT gain is firstly coded by an envelope coder with logarithmic quantization. This gain is a direct reflection of speech band signal energy level and can be retrieved by the device that calculates the voice quality estimate. A frequency band weighted signal energy level P can be calculated directly from MDCT gain according to the following:

N: Number of bands in original band for loudness generation;
M: Number of bands in MDCT gain;
K: Number of bins in MDCT coefficients;
T: Number of frames in time axis;
$Bin_{MDCT}$: MDCT bin coefficients which is a K*T matrix $$Band_{Loudness} = W_1 \cdot Bin_{MDCT}^2; \quad (11)$$

where $W_1$ is a N*K matrix to transform bin coefficients to band energy. A band-weighted signal energy P can be calculated by:

$$P = B \cdot NF \cdot (W_1 \cdot Bin_{MDCT}^2); \quad (12)$$

where B is a 1*N vector (Weighting of band perceptual importance such as B-weighting), NF is a N*N matrix for normalization. The MDCT gain is derived by:

$$\text{Band}_{Gain} = W_2 \cdot \text{Bin}_{MDCT}, \qquad (13)$$

where $\text{Bin}_{MDCT}$ is a K*T matrix, and W2 is an M*K matrix.

From equation 13 an inverse matrix can be approximated to recover $\text{Bin}'_{MDCT}$ with identical band energy to $\text{Bin}_{MDCT}$:

$$\text{Bin}'_{MDCT} = W_3 \cdot \text{Band}_{Gain}, \qquad (14)$$

Where $W_3$ is a K*M matrix.

By replacing Equation 14 into Equation 11 we can get:

$$P = B \cdot NF \cdot W_1 \cdot (W_3 \cdot \text{Band}_{Gain})^2 = W_4 \cdot (W_3 \cdot \text{Band}_{Gain})^2 \qquad (15)$$

where W4 is a 1*K vector which is calculated by:

$$W_4 = B \cdot NF \cdot W_1 \qquad (16)$$

The above strategy for calculating the frequency band weighted signal energy level P can be used for any transform based codec (DCT, QMF etc) where the corresponding gain is extractable.

Other suitable methods for partially decoding at least some of the received encoded voice packets in order to estimate perceptual importance of the lost voice packets may equally well be used. One such method is described in the US patent application US20090094026 (ALCATEL LUCENT USA INC).

It should be noted that according to some embodiments, the perceptual importance of lost voice packets are estimated by fully decoding at least some of the received encoded voice packets.

Figure 5:
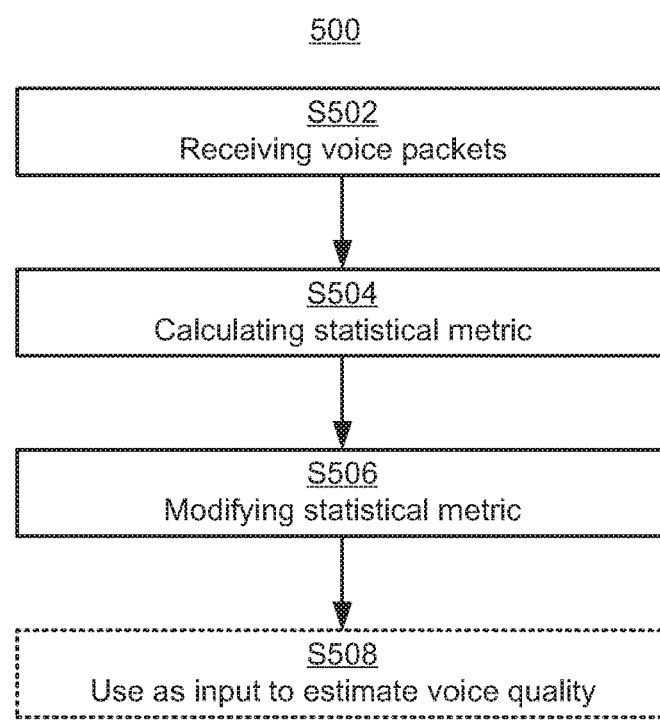
FIG. 5 shows by way of example a method for modifying a statistical metric relating to lost voice packets.

FIG. 5 describe a method 500 for modifying a statistical metric relating to lost voice packets in a packet based voice communication system. The first step S502 is the step of receiving data comprising a sequence of encoded voice packets transmitted from one or more end-points in the voice communication system, wherein encoded voice packets transmitted from the one or more end-points comprises the received sequence of encoded voice packets and one or more lost voice packets which were lost during the transmission from the one or more end-points or discarded due to latency and/or jitter in the transmission. Based on the received sequence of encoded voice packets, a statistical metric relating to the lost voice packets is calculated S504. The statistical metric is then modified S506 based on a perceptual importance of the lost voice packets. Optionally, the modified statistical metric is used as input to a voice quality estimating algorithm such that a prediction error of a voice quality estimate is reduced compared to using the unmodified statistical metric calculated in step S504 as input to the same voice quality estimating algorithm.

Figure 6:
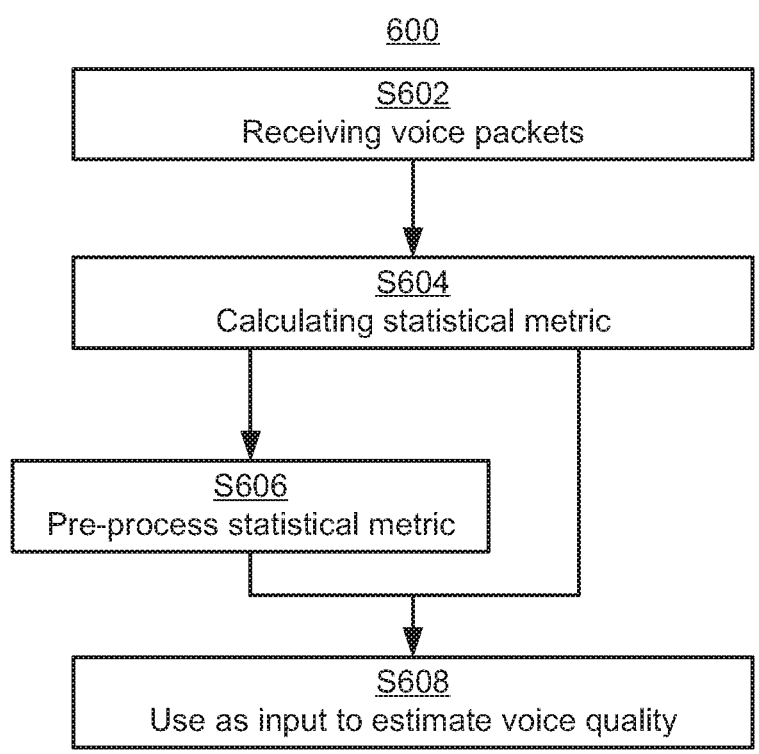
FIG. 6 shows by way of example a method for calculating a voice quality estimate.

FIG. 6 describe a method 600 for calculating a voice quality estimate in a packet based voice communication system. The first step S602 is the step of receiving data comprising a sequence of encoded voice packets. Based on the received sequence of encoded voice packets, a statistical metric is calculated S604. The final step in the method 600 is the step of using a voice quality estimating algorithm to calculate S608 the voice quality estimate. The calculation S608 is based on an input which is switchable between a first and a second input mode. In the first input mode, the statistical metric calculated S604 based on the received sequence of encoded voice packets is used as input. The second input mode, the statistical metric calculated S604 based on the received sequence of encoded voice packets is first pre-processed S606 and then used as input for the calculation S608 of the voice quality estimate. The step of pre-processing S606 leads to that a prediction error of the voice quality estimate is reduced compared to if no pre-processing is performed.

IV. Equivalents, Extensions, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method for calculating a voice quality estimate in a packet based voice communication system, the method comprising:
   receiving data comprising a sequence of encoded voice packets; and calculating, using a voice quality estimating algorithm, the voice quality estimate based on an input that is switchable between a first and a second input mode, wherein, in the first input mode, the input is a statistical metric relating to the sequence of encoded voice packets, wherein, in the second input mode, the input is a pre-processed version of the statistical metric relating to the sequence of encoded voice packets, wherein a prediction error of the voice quality estimate based on the pre-processed version of the statistical metric is reduced compared with the prediction error of the voice quality estimate based on the statistical metric, wherein the received data is transmitted from one or more end-points in the voice communication system, wherein encoded voice packets transmitted from the one or more end-points comprises the received sequence of encoded voice packets and one or more lost voice packets, and wherein the pre-processed version is generated based at least in part on weighting the lost voice packets according to their perceptual importance.

2. The method according to claim 1, further comprising: receiving input from one of the end-points indicating one of the first and the second input modes to be selected.

3. The method according to claim 1, wherein a selection between the first and the second input mode is based on one of: a computational load associated with the first and the second input modes; or a preset mode.

4. The method according to claim 1, wherein the one or more lost voice packets were lost during the transmission from the one or more end-points or discarded due to latency and/or jitter in the transmission, wherein the statistical metric is calculated from the received sequence of encoded voice packets and relates to the lost voice packets, and wherein pre-processing used to generate the pre-processed version relates to modification of the statistical metric based on a perceptual importance of the lost voice packets.

5. The method according to claim 1, wherein the statistical metric relates to groups of consecutive lost voice packets, wherein the statistical metric is calculated by weighting each group of consecutive lost voice packets based on the number of consecutive lost voice packets in the group, and wherein pre-processing used to generate the pre-processed version comprises weighting each group based on the perceptual importance of the consecutive lost voice packets in the group.

6. The method according to claim 1, wherein the perceptual importance for the one or more lost voice packets is estimated based on perceptual importance of voice packets in the sequence of encoded voice packets which are adjacent to the one or more lost voice packets.

7. The method according to claim 1, further comprising the step of:

at least decoding at least some of the received encoded voice packets in order to estimate the perceptual importance of the lost voice packets.

8. The method according to claim 1, wherein each voice packet in the received sequence of encoded voice packets comprises a separate bit indicating the perceptual importance of the voice packet.

9. The method according to claim 1, wherein the statistical metric includes at least one of:

a packet loss rate, PLR, which is the number of lost voice packets in relation to a total number of transmitted voice packets, or a burstiness factor, BF, which is one minus a number of groups of consecutive lost voice packets in relation to the number of lost voice packets.

10. A non-transitory computer-readable storage medium storing instructions adapted to carry out the method of claim 1 when executed by a device having processing capability.

11. A device for calculating a voice quality estimate in a packet based voice communication system, the device comprising:

a receiving stage configured to receive data comprising a sequence of encoded voice packets; and a voice quality estimation stage configured to calculate, using a voice quality estimating algorithm, the voice quality estimate based on an input which is switchable between a first and a second input mode, wherein, in the first input mode, the input is a statistical metric relating to the sequence of encoded voice packets, wherein in the second input mode, the input is a pre-processed version of the statistical metric relating to the sequence of encoded voice packets, wherein a prediction error of the voice quality estimate based on the pre-processed version of the statistical metric is reduced compared with the prediction error of the voice quality estimate based on the statistical metric, wherein the received data is transmitted from one or more end-points in the voice communication system, wherein encoded voice packets transmitted from the one or more end-points comprises the received sequence of encoded voice packets and one or more lost voice packets, and wherein the pre-processed version is generated based at least in part on weighting the lost voice packets according to their perceptual importance.

* * * * *